United States Patent
Brady et al.

[11] Patent Number: 6,078,849
[45] Date of Patent: Jun. 20, 2000

[54] VISION BASED PRECISION DOCKING OF VEHICLES

[75] Inventors: Daniel G. Brady; Darrell R. Hougen, both of Littleton; William A Kennedy, Morrison; Jerome F. Sobetski, Littleton, all of Colo.

[73] Assignee: Lockheed Martin Corporation, Bethesda, Md.

[21] Appl. No.: 09/209,489

[22] Filed: Dec. 11, 1998

[51] Int. Cl.[7] .............................. G06F 7/00; G06F 17/00; G01S 3/00; B60T 7/16

[52] U.S. Cl. ............................ 701/28; 701/23; 701/1; 701/93; 701/96; 701/200; 701/301; 342/455; 180/167; 180/168; 180/169

[58] Field of Search ............................ 701/23, 28, 200, 701/301, 3, 93, 96, 1; 180/167, 168, 169; 342/350, 455, 457, 458; 318/587

[56] References Cited

U.S. PATENT DOCUMENTS

| | | | |
|---|---|---|---|
| 4,278,142 | 7/1981 | Kono | 180/168 |
| 4,566,032 | 1/1986 | Hirooka et al. | 358/103 |
| 4,630,109 | 12/1986 | Barton | 358/103 |
| 4,931,930 | 6/1990 | Shyu et al. | 701/36 |
| 5,357,432 | 10/1994 | Margolis et al. | 701/23 |
| 5,390,118 | 2/1995 | Margolis et al. | 701/23 |
| 5,742,141 | 4/1998 | Czekaj | 318/587 |

*Primary Examiner*—William A. Cuchlinski, Jr.
*Assistant Examiner*—Yonel Beaulieu
*Attorney, Agent, or Firm*—Whitham, Curtis & Whitham

[57] ABSTRACT

A three phase control arrangement is employed after visual detection of a target at greater range than otherwise available. The first and last phases employ an optimization criterion for which errors do not vary with distance from a target; limiting the initial error and process error in an intermediate phase which controls approach trajectory to the intended docking location and yielding repeatable high accuracy docking. The three phase approach with different control criteria and control gain parameters makes feasible a docking maneuver that begins at a much greater range and potentially greater lateral separation from the destination than would otherwise be possible, while providing control of both the final location and final orientation of the vehicle. A preferred visual thresholding technique provides consistency of results over a wide range of illumination and contrast conditions while limiting the computation burden for target image acquisition and tracking.

12 Claims, 3 Drawing Sheets

VISION BASED PRECISION DOCKING OF VEHICLES

STATEMENT OF GOVERNMENT INTEREST

This invention was made with Government support under DTFH61-94-X-00001 awarded by the U. S. Government. The Government has certain rights in this invention.

BACKGROUND OF THE INVENTION

1. Field of the Invention

The present invention generally relates to automatic guidance of vehicles and, more particularly, to the precision execution of docking or parking maneuvers based on visually detectable locations to precisely guide the vehicle to a desired location.

2. Description of the Prior Art

Various approaches have been made to automatic control of numerous aspects of vehicle operation with many differing objectives such as safety, avoidance of operator fatigue and the like which have met with varying degrees of success. For example, for control of automobiles, various arrangements have been proposed to maintain a minimum separation distance between vehicles and regulate speed and/or provide guidance on, for example, high-speed highways. Automatic guidance systems have been employed with substantial success to maintain a chosen course for aircraft and seagoing vessels. For rail traffic, particularly commuter trains in which the vehicle movement is constrained to the locus of movement defined by the tracks, position locating arrangements are known to control the position at which a vehicle may be brought to a stop (e.g. adjacent a particular position along a platform) as well as maintaining train separation through block monitoring and control.

However, known applications for non-rail vehicle guidance are generally limited to use where exact vehicle position is not particularly critical and the control maintains a particular mode of operation or movement of the vehicle rather than executing a particular maneuver. For example, known systems may be used to maintain a given compass heading at a given speed for ships and aircraft or, for automotive vehicles, to follow a track-like locus of detectable features (e.g. a painted stripe on the roadway) at a given or controllable speed.

In this latter regard, efforts continue toward developing an automated highway system to guide and control speed of vehicles during trips over extended distances. However, until recently, the automation of particular and precise maneuvers and the accurate automated positioning of a vehicle relative to some fixed facility (e.g. bus stop, wheelchair access ramp, loading dock, etc.) has not been seriously addressed. While some devices have been developed (essentially as vision aids for the vehicle operator of large vehicles where certain views are restricted from the location of the operator) any maneuver for precise positioning of the vehicle is generally done manually or, at most, by following markers, magnets, buried cables or the like in the roadway. Such devices are subject to substantial wear and damage unless they are buried and buried devices are subject to electromagnetic interference (e.g. reinforcing steel in the roadway).

Therefore, neither type of system has proven particularly reliable and maintenance costs are substantial in any event. In particular, if tracking of such devices is lost, it is extremely difficult to reacquire, during which autonomous guidance of the vehicle will not be possible.

Sonar arrangements have also been attempted to provide vehicle guidance or separation from obstacles or other vehicles. However, sonar-based systems are very limited in range and subject to interference from ambient noise, wind, doppler effects and the like. Even for highly directional sonar systems, the area covered and the possible sources of noise increase greatly with distance. Therefore, sonar-based systems are not able to develop high confidence factors for target acquisition or to acquire targets at a range supporting control of change of course or speed at moderate rates.

During the same period of time, however, the need for precise maneuvering and positioning of vehicles has become increasingly important. For example, the requirement for provision of access for handicapped persons to public transportation often requires the placement of the vehicle so that curbs will not need to be negotiated. Ground clearance of buses means a substantial difference in height of a step above a roadway as compared with a curb and may thus easily become a source of injury. The increased use of trucks for transportation of goods in recent years requires accurate placement of the truck relative to a loading dock in order to avoid accidents and injuries to personnel and impediments to rapid loading and unloading of cargo.

Additionally, such maneuvers and the size and configurations of buses or trucks often obscures or prevents a line of sight being maintained from the vehicle operator to a fixed structure which defines the vehicle position to be achieved. Wear or damage to portions of the vehicle (e.g. tires, steering gear, body panels and the like) often results from contact of the vehicle with such fixed structures, especially curbs. Furthermore, the accurate positioning of a vehicle for public transport or the transportation of goods must often be carried out dozens if not hundreds of times each day. Therefore, damage to the vehicle is a relatively regular occurrence.

To be effective, positioning must be repeatably accurate within a small tolerance of several inches or less and with an angular alignment of a few degrees or less. This accuracy must often be accomplished with one of several maneuvers, some of which may require reversal of vehicle direction in areas potentially congested with vehicular and/or pedestrian traffic. While sufficient accuracy has been approached with devices placed in or on the roadway, in addition to the drawbacks alluded to above, such arrangements allow essentially no departure from a fixed path or alternative maneuvers.

In summary, while various approaches to autonomous vehicle guidance and other automatic controls have been under development for a number of years, no system is yet available which can repeatably achieve accurate positioning and alignment of a vehicle or automatically control the vehicle through a maneuver necessary to achieve such positioning. Current systems also are incapable of supporting variant or different maneuvers to achieve such positioning of a vehicle and are generally expensive and difficult to install and/or maintain. Additionally, it is desirable that a system having such a capability be compatible and fully integratable with arrangements for providing autonomous guidance control suitable for a highway environment. Further, guidance systems suitable for roadway vehicles have not employed techniques which are applicable to other modes of transport such as marine vessels (including submarines) or aircraft.

SUMMARY OF THE INVENTION

It is therefore an object of the present invention to provide a vision-based guidance system for executing parking or docking maneuvers of a vehicle with high accuracy and repeatability and operable in different modes.

It is another object of the invention to provide a guidance system capable of executing an accurate docking maneuver which is applicable to marine vessels and aircraft as well as roadway vehicles.

It is a further object of the invention to provide a robust autonomous guidance system which can operate at a relatively long range and which is relatively inexpensive to install and maintain.

In order to accomplish these and other objects of the invention, a method of vision based automated vehicle guidance to a location is provided comprising the steps of approximating distance to a visual target detected by a camera located on a vehicle, and three phases of guidance control including a first phase between a first distance and a second distance from said target, during which an angle between vehicle trajectory and a direction toward a visual target is minimized, a second phase between the second distance and a third distance from the target, during which an angle between a desired direction and a location of the vehicle relative to the target is minimized, and a third phase between the third distance from said target and the destination location, during which an angle between vehicle trajectory and a direction toward the visual target is minimized. Control gain is based upon a proportional derivative formula and changed in each phase.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
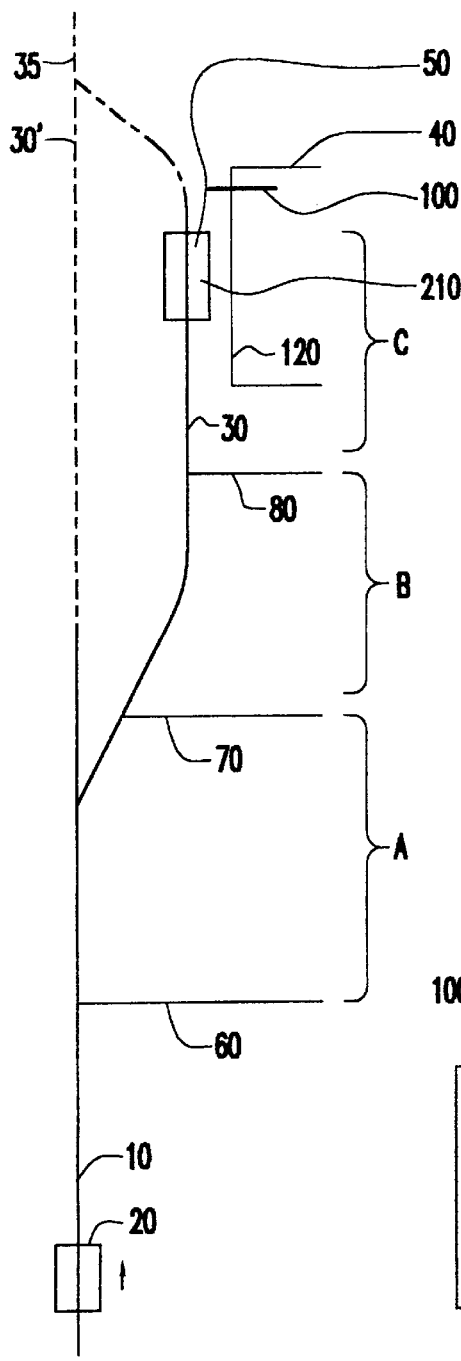
FIG. 1 is a plan view of a docking maneuver in accordance with the invention.

Referring now to the drawings, and more particularly to FIG. 1, there is shown, in plan view, a docking maneuver in accordance with the invention. It should be understood that the initial portion of vehicle path 10 along which vehicle 20 is to travel need not be straight but is so depicted in the interest of clarity. It should be further understood that at the position of vehicle 20 depicted, vehicle 20 could be under manual control or under control of an autonomous guidance arrangement for path following along a highway or other thoroughfare, the details of which are not important to the practice of the invention.

However, in this latter regard, it is preferred that the autonomous guidance system for deriving such a function, if any, also be vision-based, with which the docking system of the invention is particularly compatible and integrable. (It should also be appreciated that the docking system in accordance with the invention is, itself, an autonomous guidance system but the term "docking system" will be used hereinafter to distinguish between the intended function of the invention to execute a maneuver to bring the vehicle to a specific location with high accuracy and that of a system principally directed to guidance of a vehicle along a highway or thoroughfare.

Further in FIG. 1, an exemplary docking maneuver is indicated by reference numeral 30 to bring the vehicle 20 alongside a fixed structure 40 to docking location 50. An alternative maneuver to achieve the same docking is depicted by dashed line 30'. The position of onset of control in accordance with the invention is indicated by reference numeral 60. The distance between location 60 and location 50 (which is about eight meters from the location of target 100) is preferably up to about 110 to 120 meters to allow a gradual decrease in speed and the avoidance of abrupt path changes. Such a distance is far beyond the reliable operating distance for sonar-based guidance systems alluded to above.

This distance from location 60 to location 50 is, in accordance with the practice of a preferred form of the invention, divided into three distance range segments, A, B and C. The extent of segment A is preferably from about 24 meters to about 120 meters from target 100; the extent of segment B is preferably from about 15 meters to 24 meters from target 100; and the extent of segment C is preferably from about 8 meters to about 15 meters from target 100. The location of boundaries 70, 80 and the length of segments are chosen in view of the space necessary to perform the maneuver in a relatively natural manner simulating manual control and for limitation of errors in vehicle position in accordance with the geometrical scenario on which the preferred form of the invention is based, as will be discussed in detail below with reference to FIG. 2.

It should be appreciated in the following discussion that some errors in estimation of location by a vision-based system increase quadratically with range while others remain substantially constant with range but are not sufficient to accomplish a generalized maneuver. The invention exploits the difference between the behavior of these errors to enhance the accuracy of a generalized maneuver as well as to execute the maneuver.

Figure 2:
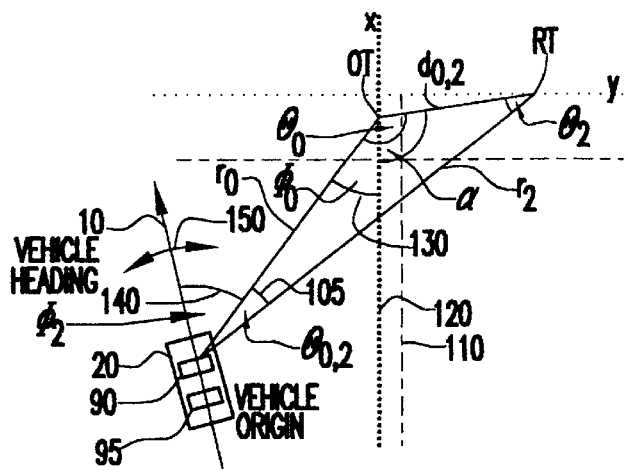
FIG. 2 is an illustration, in plan view, of the geometry utilized in the vision-based guidance system in accordance with the invention.

Referring now to FIG. 2, a generalized plan view of the preferred geometry for practice of the invention is shown. It should be understood that many different geometries could be used to define and execute a particular maneuver. However, it has been discovered by the inventors that the geometry and sequential application of guidance criteria in the manner which will be described below is particularly effective for achieving docking maneuvers while being particularly compatible with requirements of other autonomous guidance systems. This meritorious effect of the invention is largely achieved through the exploitation of geometry in which errors do not vary with distance combined with minimization of effects of portions of the geometry in which errors vary quadratically with distance.

It can be appreciated that for any maneuver relative to a fixed location to be carried out accurately, the position of the vehicle relative to that fixed position must be accurately known. It can also be appreciated that vision systems necessarily must accommodate a three-dimensional environment since they must rely on the measurement of angles to visually detectable targets. It is also well-recognized that the determination of geometrical measurements involves rapidly increasing error as the angle measured becomes small.

Consider, for example, the well-known range finder which relies on superposition of images of an object from two locations separated along a baseline. As the object becomes distant, compared to the separation of the imaging sources, the angle subtended by the separation of the image sources along the baseline becomes very small and the lines of sight from the respective imaging locations on a baseline to the imaged object become almost parallel as the angle between them approaches zero. The computation of distance is approximated by a function of the tangent of the angle between the lines of sight to the object. Accuracy is further reduced for a given baseline length if the baseline is oriented at a significant angle to perpendicular to a line of sight from the target to a location on the baseline.

(This error may not be of particular importance in some applications such as the focusing of a lens system. In such an application, the conjugate nature of the image and object planes renders accuracy of focus less important and largely compensated by increase of depth of field with increasing distance. Therefore, rangefinder arrangements are especially well-suited as focusing aids for optical systems and such uses have been known for many years.)

Accordingly, it can be shown that the error based on the tangent of the angle between two lines of sight varies approximately quadratically with (e.g. as the square of) the distance over which the measurement is made. This has proven a severe limitation on the implementation of vision-based systems for automatic control somewhat similar to the limitations on sonar-based systems for similar purposes; the difference being largely in the fact that the reliability of sonar imaging decreases and the geographic scope of interference sources increases rapidly with distance while, for vision-based systems, errors of resolution and measurement increase rapidly with distance. It should be appreciated in the following discussion that the invention provides for isolation or minimization of the effects of errors which increase quadratically with distance of an observation position to an optical target.

In the preferred geometry in accordance with the invention as shown in FIG. 2, the geometry utilized is essentially the inverse of that used in a rangefinder. That is, for simplicity and economy of installation and compatibility with a vision based autonomous guidance system (e.g. for a highway environment), a single camera 90 is installed at some location on the vehicle. For the autonomous guidance system with which it is contemplated that the invention should be integrated, it is preferred to place the camera 90 on the approximate center line of the vehicle, preferably behind the rear-view mirror from the vantage point of the driver in order to be unobtrusive to the driver and avoid blocking significant portions of the field of view. However, it should be appreciated that such a location may not be ideal for a docking system and inherently prevents a view of a fixed object located near the ground adjacent which the vehicle is to be docked or parked.

Figure 3:
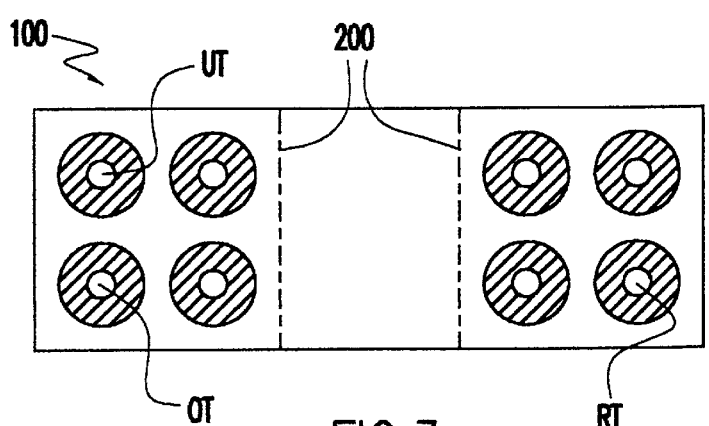
FIG. 3 is a front elevation view of a preferred form of visual target in accordance with the invention.

From this camera location, a line of sight can, however, exist to a vision system target 100 which is placed near (preferably about eight meters beyond) the desired docking location. An exemplary preferred form of such a vision system target is shown in FIG. 3. Vision system target 100 can be a composite target which establishes an accurate and fixed spacing among at least three individual targets which are used in the docking system of the invention as well as other targets whose primary function is to facilitate visual acquisition of vision system target 100 by the imaging camera 90. The composite target can also be formed in plural sections, as indicated by dashed lines 200, which is preferred for convenience of installation and maximization of accuracy within practical and generalized physical constraints. Additional indicia can be provided to convey additional information to the vision system such as an identification of the particular location (e.g. a geographical name of a bus stop) at which docking is to be done.

Specifically, each of portions of the composite target, however configured into sections, includes individual targets which are preferably annular-shaped, high contrast patterns since the properties of the annular shape are easily recognized and largely distinct from shapes which may be encountered in (e.g. natural) visual background. The regular spacing and array of individual targets on composite target 100 serves to further distinguish composite target 100 from other patterns which could be recognized by the vision system. Relative to other dimensions preferred for practice of the invention, the individual targets have an inner radius of 1.5 inches and an outer radius of three inches and are spaced on the composite target in groups of four; the individual targets in each group having a center-to-center spacing of eight inches in the horizontal and vertical directions.

This pattern causes camera 90, executing a commonly utilized raster scan, to develop an extremely distinctive and easily recognized signal pattern (preferably from its Y/C output, and possibly utilizing auto-iris, auto-gain and automatic white balance functions provided therein to the extent such automatic functions may enhance contrast, although NTSC and other format signals could be used and automatic functions may be disabled or adjusted to provide maximum black/white contrast) at a relatively long range (depending on the focal length of the lens of camera 90 relative to its imaging area, and which may also be automatically variable) when the width of the annulus reaches an image size corresponding to a very few pixels. The circular form of the individual targets also allows simple and rapidly executed determination of the relative position in the field of view of the centroid of any individual target of interest to increase accuracy of relative location determination.

The principal target of interest in the preferred embodiment of the invention is chosen for convenience as the origin target OT at the lower left of the composite target 100. For determination of distance to the vision system target 100, the upper left target UT is preferably used since the angle between OT and UT does not vary with the lateral position or trajectory of the vehicle on the ground which is assumed to be substantially planar and perpendicular to the target. Target UT is used in conjunction with target OT to determine range.

The origin target OT is preferably used to define a reference point for the entire geometry of FIG. 2. The angle subtended by the distance between OT and UT (line of sight thereto being superimposed in the plan view of FIG. 2) approximates the distance between the vehicle (more accurately camera 90) and target OT by a function of the tangent of that angle which can be determined from the spacing of the images of the respective individual targets at the image plane of the camera and the focal length of the camera lens.

It should be recognized that, especially at long range, target 100 and the line connecting OT and UT is substantially perpendicular to the line of sight of camera 90 and any error will be negligible. The tangent of the angle can also be approximated by the angle, itself, at small angles. While this determination of range potentially contains errors which vary quadratically with distance, detection at a large although approximate distance allows control to be exercised in a manner in which the exact distance is not critical. The effect of distance error is minimized by basing control on minimization of an angle in which the error does not vary with distance, as will be discussed below.

At somewhat closer range, and while the portion of target 100 including target RT can be imaged, errors will also vary quadratically with distance. However, the location of the vehicle can be determined with greater accuracy by an increased spacing between target OT and target RT (and which need not be in the same plane as targets OT and UT). At very close range, after the trajectory of the vehicle has been controlled over a substantial distance and its location coarsely established, control is again based on minimization of an angle which does not include error which varies with distance and at a distance where the error will be small.

For purposes of the following discussion, line 120 of FIG. 2 represents a reference line which may, for example, include and extend from the edge of a curb or loading dock relative to which the docking maneuver is to be performed. The angle 130 between line 120 and the angle of the line of sight between camera 90 and the origin target OT will be referred to as the interior angle. The angle 140 between the center line of the vehicle 20 and the origin target (which may vary as shown by double-arrow 150) will be referred to as the off-center or exterior angle and is determined relative to the axis of the vehicle or camera. At the moment the target 100 is acquired by the vision system, angles 130 and 140 may be essentially arbitrary, as illustrated.

It should also be understood in the following discussion that the guidance control function in accordance with the invention (and which does not include a speed control function, although it is preferred that a speed control function be separately provided as can be conveniently done in connection with range approximations developed by the invention) develops a steering angle $\Phi_c$ which can be expressed as a proportional derivative function:

$$\Phi_c = k_p \phi_e + k_v \phi_e$$

where $\Phi_e$ is either interior angle 130, also referred to hereinafter as $\Phi_a$ or off-center or exterior angle 140, also referred to hereinafter as $\Phi_b$, $\phi_e$ is the time derivative of $\Phi_e$ (preferably determined by the difference of values of $\Phi_e$ across two iterations or steps), $k_p$ and $k_v$ are constants (or functions of time, speed, distance, error angle and the like) of proportionality to the angular error and rate of change of angular error. (As a matter of nomenclature, the angles 130 and 140 are conveniently taken as the deviations $\Phi_a$ and $\Phi_b$ on which control is based, as will be discussed in greater detail below.) Different values (or functions) of $k_p$ and $k_v$ will be used in each of the separate phases and $\Phi_e$ will alternate between angles 140 and 130 in each of the control phases.

As alluded to above, the errors in determination of some parameters of the geometry of a three-dimensional environment vary quadratically with distance. The control arrangement in accordance with the invention seeks to minimize the importance of errors which may be large during various phases of the docking maneuver and to exploit, to the greatest extent possible consistent with the desired maneuver, the use of approximations of the geometry for which errors are small and invariant with distance. Errors in approximations of distance, as discussed above, vary quadratically with distance (and, thus, while approximations of distance initially containing potentially large errors, accuracy rapidly increases with diminishing distance). By the same token, the error in the determination of the interior angle 130 varies quadratically with distance.

The error in the exterior angle 140 is constant with distance since its approximation requires use of only a single point in the environment of FIG. 2 as detected in the field of camera 90. In contrast, the determination of interior angle 130 requires the location of target OT and another arbitrary point (e.g. RT) to directly or indirectly define line 120 and the error in the determination of vehicle location will vary quadratically with distance, as does a determination of the distance, itself.

Thus, the preferred form of the control arrangement in accordance with the invention is divided into three phases in accordance with the distance ranges A, B and C of FIG. 1. At long range to the target 100, between locations 60 and 70, the control arrangement seeks to minimize the exterior angle 140 using low gain (e.g. $k_p$ and $k_v$) for the control signals. The low control gain avoids abrupt corrections, particularly while vehicle speed may be relatively high. Nevertheless, by basing control on reducing the exterior angle during this phase, the vehicle 20 may gently be brought to the right toward line 120, as shown in phase A of FIG. 1, to improve positioning and trajectory for the second control phase with the vehicle centerline substantially aligned with the origin target. The angular error in vehicle trajectory during this phase of the maneuver remains constant with distance while errors in distance determination are relatively non-critical, as described above.

Regardless of the initial position and trajectory of the vehicle, phase A will align the vehicle trajectory substantially toward target OT and reduce the distance between the vehicle and line 120, which is defined as being to the left of line 110 and representing the final alignment and position of the vehicle. This portion of the maneuver also has the beneficial effect of orienting the vehicle such that target RT is unconditionally (for practical geometries and camera lens focal lengths) brought into view of the camera field, although not initially required to initiate phase A.

In the second control phase B when the vehicle is between locations 70 and 80, the control arrangement seeks to minimize the interior angle 130. Control gain will preferably be increased to achieve reduction of interior angle but the maneuver will preferably not be abrupt if speed is reduced during phase A in accordance with any desired function of approximated distance.

The minimization of interior angle 130, $\Phi_b$, will initially direct the vehicle 20 farther to the right (from a substantially arbitrary but somewhat limited initial interior angle established as noted above and a vehicle trajectory generally coincident with the line of sight to the origin target OT) and then, as line 120 is closely approached or reached, as deviation $\Phi_b$ becomes near zero, to the left to direct the vehicle heading generally parallel to line 120 to maintain the minimum interior angle achieved. Some slight overshoot of line 120 is possible and generally will be tolerable. Numerous ways of limiting possible overshoot of line 120, such as providing a non-linear function for $k_p$, limiting approach angle by placement of target RT and the like will be evident to those skilled in the art, particularly in view of the following discussion.

During the minimization of interior angle 130 in phase B, the desired trajectory to align the vehicle with line 120 can be determined from the relative position of the origin target OT and the vehicle. If $d_{0,2}$ is the distance between target OT and target RT (and not necessarily perpendicular to line 120 or 110), the unknown distance $r_2$ to target RT, by application of the law of cosines, can be expressed as $$r_2 = r_0 \cos \Theta_{0,2} \pm (d_{0,2}^2 - r_0^2 \sin^2 \Theta_{0,2})^{1/2}$$

where the positive discriminant is chosen based on knowledge of vehicle position relative to the signs. While an approximation, it must be recalled that error in $r_0$ is rapidly diminishing with distance during the maneuver and the approximation of position converges to coordinates having sufficient accuracy for the practice of the invention and to bring the vehicle trajectory closely coincident with line 120.

Then, from the law of sines, $\Theta_0$ is given by $$\Theta_0 = \sin^{-1}((r_2/d_{0,2})\sin\Theta_{0,2})$$

where the result is assumed to be in the second quadrant, again from the orientation of the targets OT and RT. The angle between line 120 and the line connecting OT and RT is called the approach angle, $\alpha$. The interior angle 130 may thus be expressed as $(\alpha-\Theta_0)$. Note that for a straight approach (e.g. along line 120), the approach angle is 90° plus an angle that depends on the relative separation of OT and RT and the distance of RT behind OT in a direction parallel to line 120. Thus, $$k\alpha = 90° + \sin^{-1}(x/d_{0,2}).$$

Therefore, to minimize the interior angle, the interior angle 130 is considered as the deviation $\Phi_b$ from a straight approach which can be expressed as the difference between a straight approach and the approach angle $\alpha$. To minimize the deviation/interior angle, the vehicle trajectory is first brought further to the right and then increasingly less right and then slightly leftward as the vehicle becomes aligned with line 120, as discussed above. While the error in this geometry varies with distance, the error decreases during phase B and a smooth alteration of vehicle trajectory is achieved (particularly as the interior angle approaches zero) and the vehicle trajectory will be brought close to coincident with line 120 and the exterior or off-center angle 140 brought close to zero, as well.

In the third phase, phase C, the trajectory of the vehicle is again made to track the origin target OT and minimize exterior angle 140 at distances from target 100 where the error in range will be very small. Again, it should be recalled that the error in exterior angle does not vary with distance and by tracking origin target OT, both position at termination of movement and the angle of the center line of the vehicle to line 120 can be made very small. By increasing control gain relative to phases A and B, accurate positioning of the vehicle relative to target OT and UT, can be achieved without the control being abrupt since very low speed has, preferably, also been attained by the onset of control phase C.

In practice, the above-described control arrangement has been capable of docking within a lateral margin of two inches and with an angular deviation of less than two degrees in over 90% of trials. Abrupt changes in trajectory are avoided and the maneuver approaches the ideal which could be manually achieved but with much increased repeatability and accuracy.

It should also be appreciated that phase B could, in theory be a full solution to providing the same maneuver but for compensation for change of the magnitude of errors with distance and extreme complexity of the control arrangement to alter control gain in regard to speed and the space available while avoiding overcorrection and loss of visual tracking of the targets.

Thus control gain in phase A is relatively very small where there is ample space to provide correction of positioning for phase B as well as improving the approximation of distance while reducing speed and thus exploiting the capability of the invention for target acquisition and tracking at a greater distance than in other known systems.

In phase B, the control gains are small but somewhat increased from phase A. Relatively accurate positioning during phase A (during which the error is not distance dependent) is of assistance in using small control gains in the approach trajectory control of phase B to avoid over-control and limitation of error in the approximation of the interior angle. Conversely, the onset of the approach trajectory control of phase B can be delayed until the distance dependent errors inherent therein are acceptably small.

In phase C, control gain is substantially increased and control is based on minimization of exterior angle, the error in which is invariant with distance during relatively large and rapid proportional changes in distance even with slow vehicle movement thus avoiding over-control as control gain increases. Thus, the separation of the control arrangement into three phases avoids complexity in alteration of control gain and approach trajectory criteria based upon an estimation of interior angle and control of errors which vary greatly with distance and maximally exploiting geometries in which errors are constant with distance.

It should be further appreciated that the sequence of phases and geometry discussed above is also common to the alternative maneuver 30' illustrated in FIG. 1 (i.e. in the opposite direction, through larger trajectory and control angles and at reduced speed). The only alteration would be one of hardware (to supply a backward view of the targets relative to vehicle direction) and control gain (assuming a lower speed approach). This alternate maneuver could be applied if parked vehicles or traffic prevented the use of maneuver 30, necessitating a "parallel parking" type of maneuver or for backing a vehicle into position adjacent a loading dock (e.g. for loading or unloading the vehicle through a rear door rather than a side door). It should also be appreciated that lines 110 and 120 could be at any angle to initial vehicle trajectory 10, such as for achieving diagonal, "fringe" parking at a location along a sawtooth-shaped curb as is often found in bus depots.

Figure 4:
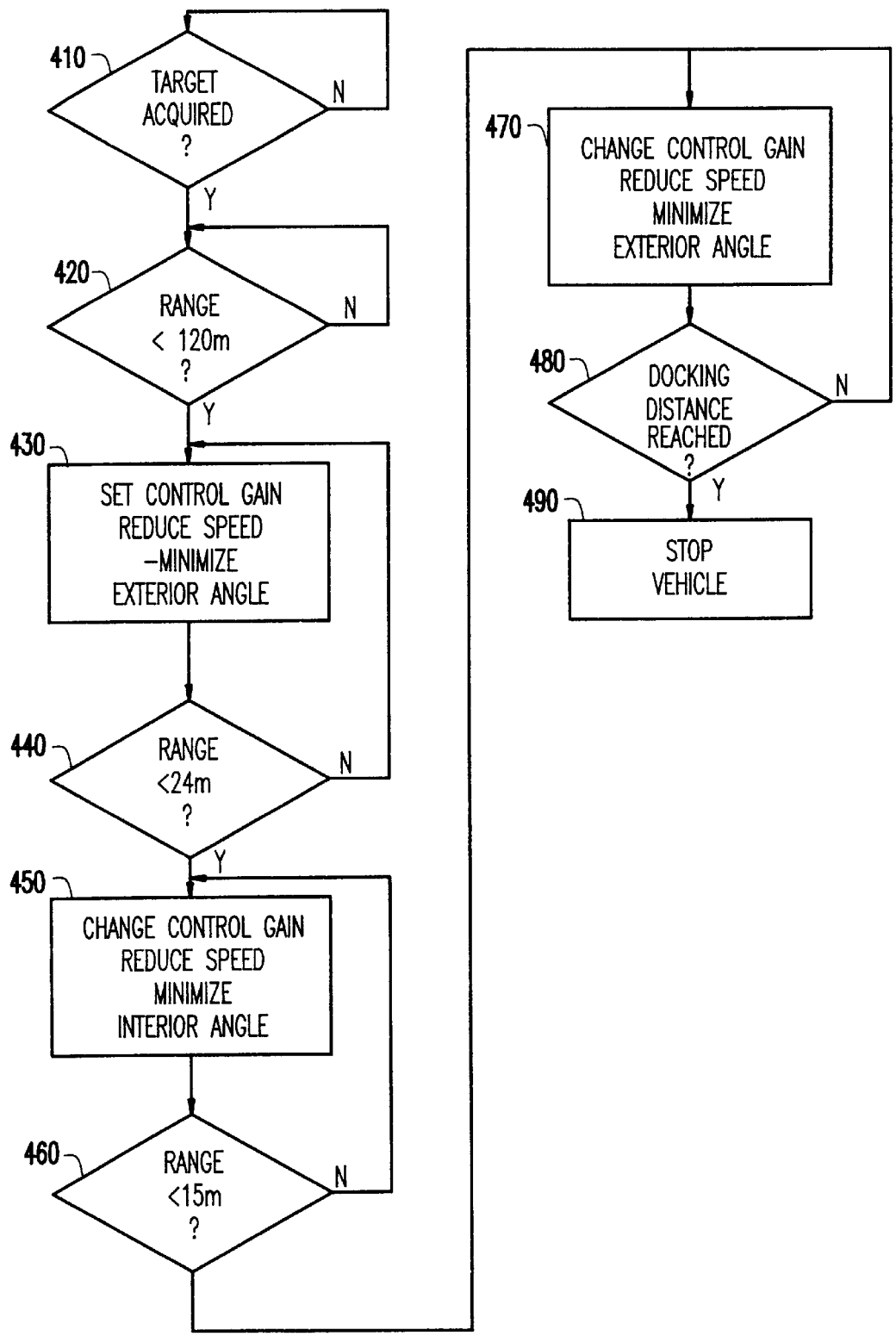
FIG. 4 is a flow chart or high-level block diagram of a preferred vision-based control arrangement in accordance with the invention.

In summary, the operation of the invention is illustrated in FIG. 4. Specifically, the process in accordance with the invention is in a wait state and exerts no control over the vehicle until a visual target is acquired, as depicted by the loop at step 410. Once the target is acquired, the range is approximated and tested against a distance threshold of, preferably 120 meters to invoke phase A control, as depicted at 420. In accordance with phase A, the control gains are set to low levels to control guidance to minimize exterior angle 140, as depicted at 430. Testing against another distance threshold at 440 continues the process until the vehicle reaches a distance from the target where it is chosen to initiate control phase B.

As illustrated at 450, the control gain is altered somewhat and guidance is controlled to minimize interior angle 130 and thus control approach trajectory as described above from a location which can be estimated with relatively good accuracy based on the vehicle trajectory and location achieved in phase A. This process continues until a chosen distance is reached for initiation of phase C, determined at 460. Then, as depicted at 470, the control gain is again changed and guidance control is again based on a criteria of minimization of exterior angle 140 to directly track origin target OT.

This process continues at low vehicle speed and consequent high control precision to approach the desired location from a short lateral distance and small approach angle until the docking range distance has been reached, as depicted at 480, whereupon the vehicle is stopped, as illustrated at 490. By so doing, the desired docking position is reached within a small positional and angular tolerance in a preponderance of trials.

Figure 5:
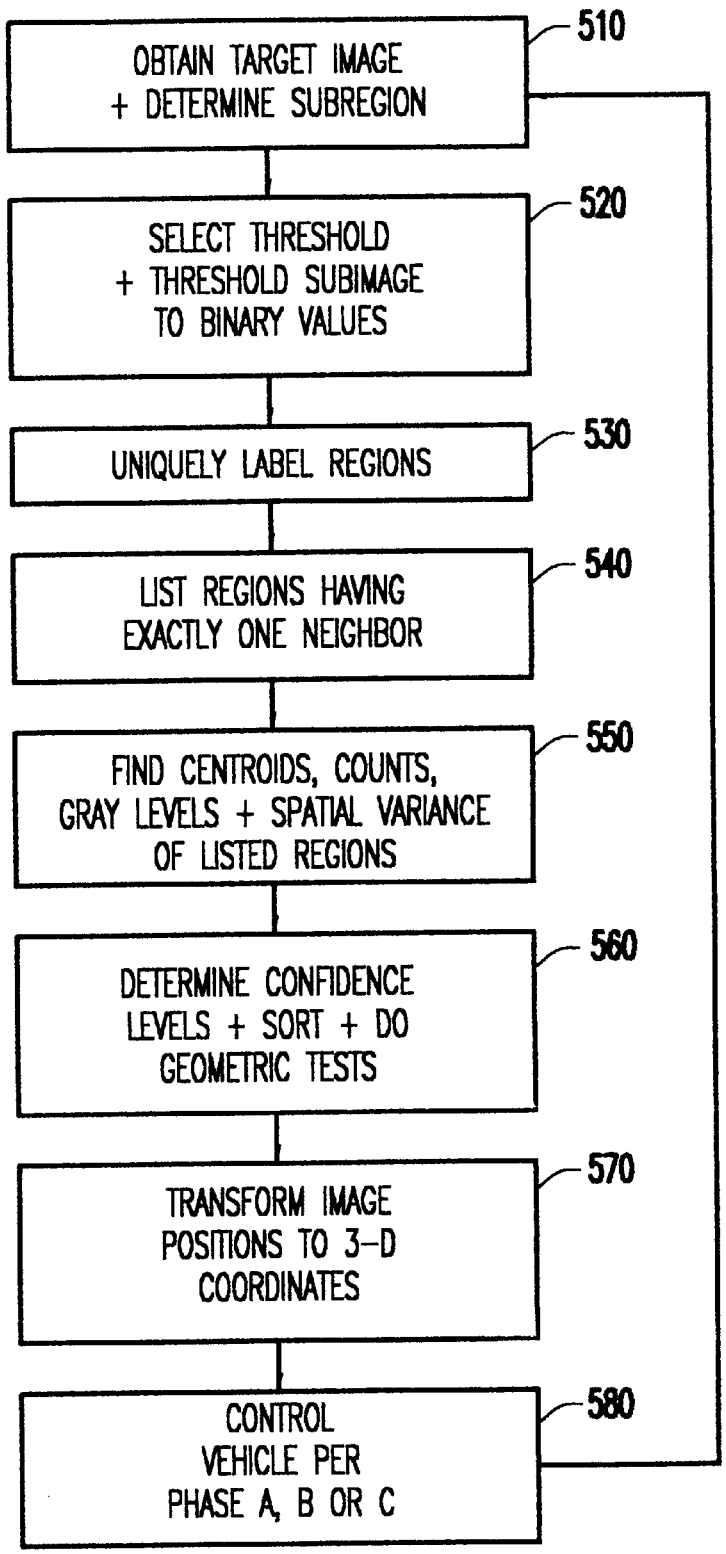
FIG. 5 is a flow chart or high-level block diagram of threshold processing in accordance with the invention.

While vision based systems may provide advantages relative to other trackable media, particularly when in the form discussed above which is preferred for implementation of the invention and the vision based system in accordance with the invention provides relatively simple and rapidly computable control values in substantially real time, vision-based systems can also be computationally intensive in target recognition and acquisition at different illumination (e.g. day and night) and contrast (e.g. fog and rain) conditions. Accordingly, as a perfecting feature of the invention, a preferred form of thresholding system for target recognition is illustrated in FIG. 5. This process is preferably continually repeated for each image frame developed by camera 90.

Upon detecting a potential image of visual system target 100 by detecting a particular spatial separation or pattern of high contrast features in the signal produced during raster scanning, the region of the image in which the potential target appears is determined, as depicted at 510. This immediately reduces the number of pixels processed by a factor of ten or more (recalling that the system target 100 is detected at substantial range where the image of individual targets is very small and contains relatively few pixels). A threshold is then selected based on past performance and sub-image statistics and the selected region subjected to the selected threshold to deliver a binary image of the target, as depicted at 420, to reduce the bit depth of further image processing. Connected regions having the same binary value or gray level are then each provided with a unique label, as depicted at 530.

As a property of the closed, annular shapes of individual targets, the inner circular region of the target will have only one neighboring region which has the same centroid as the annular region. Accordingly, data is further reduced by listing regions having exactly one neighboring region, as shown at 540. Members of this list are subjected to further determination of centroids, counts, average gray levels and spatial variance for consistency with patterns on the system target 100, as illustrated at 550.

Based on these determinations in regard to each listed region, a confidence level can be assigned and the regions sorted by confidence level with lower confidence level regions being discarded from further evaluation. As further illustrated at 560, geometric tests can be performed on the remaining regions to determine the specific targets of interest (e.g. OT, RT, UT) and their relative positions within the image derived by camera 90.

Each combination of relative positions (for a given focal length of the lens system of camera 90) will map to a specific location of the vehicle relative to the origin target, allowing the vehicle position and heading relative thereto to be uniquely determined (assuming all valid solutions are in a single quadrant relative to the camera). This transformation 570 is preferably accomplished with a transformation matrix stored in memory of a processor 95 aboard the vehicle which also serves to carry out the guidance control necessary to a desired maneuver. Thus, the processor is continually supplied with estimates of relatively high accuracy during all phases of the docking maneuver.

In view of the foregoing, it can be seen that the invention provides a robust autonomous guidance system or complement thereto which is capable of accurate and consistently repeatable parking and docking maneuvers and which is effective to acquire a visual target at long range and compatible with other forms of autonomous guidance systems directed to other functions and environments.

It should also be appreciated that while the invention has been described in respect of a particular maneuver that results in high accuracy of vehicle positioning in both location and angular position, other further maneuvers could be executed with correspondingly high accuracy from the position so acquired. For example, while the operation described above is sufficient to bring a vehicle alongside a curb location or loading dock or parking at a "sawtooth" array of parking bays, the same procedure could guide the vehicle accurately to position 35 along path 30', from which a parallel parking maneuver could be executed. Similarly, the rear loading door of a truck could be brought adjacent a loading dock by a predetermined and repeatable maneuver from any position attained with precision provided by the invention.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of vision based automated vehicle guidance to a location comprising the steps of approximating distance to a visual target detected by a camera located on a vehicle, a first phase between a first distance and a second distance from said target, minimizing an angle between vehicle trajectory and a direction toward said visual target, a second phase between said second distance and a third distance from said target, minimizing an angle between a desired direction and a location of said vehicle relative to said visual target, and a third phase between said third distance from said target and said location, minimizing an angle between vehicle trajectory and a direction toward said visual target.

2. A method as recited in claim 1, including the step of providing a first control gain during said first phase.

3. A method as recited in claim 2, including the further step of providing a second control gain, different from said first control gain during said second phase.

4. A method as recited in claim 3, wherein said second control gain is greater than said first control gain.

5. A method as recited in claim 3, including the further step of providing a third control gain, different from said second control gain during said third phase.

6. A method as recited in claim 5, wherein said third control gain is greater than said second control gain.

7. A method as recited in claim 1, wherein each of said first, second and third phases provide guidance control which is proportional to a weighted sum of a deviation angle and a rate of change of said deviation angle.

8. A method as recited in claim 1, wherein said step of approximating a distance includes the step of detecting a first visual target and a second visual target.

9. A method as recited in claim 8, wherein said second visual target is vertically displaced from said first visual target.

10. A method as recited in claim 8, wherein said second phase includes the step of detecting a third visual target.

11. A method as recited in claim 10, wherein said third visual target is horizontally displaced from said first visual target.

12. A method as recited in claim 11, wherein a location of said third visual target defines an approach angle of said vehicle to said location.

* * * * *